United States Patent
Patil et al.

(10) Patent No.: US 9,233,874 B2
(45) Date of Patent: Jan. 12, 2016

(54) CEMENT COMPOSITIONS WITH A HIGH-DENSITY ADDITIVE OF SILICON CARBIDE OR SINTERED BAUXITE

(75) Inventors: Rahul Chandrakant Patil, Maharashtra (IN); Sandip Prabhakar Patil, Maharashtra (IN); Keith Armstrong, Balmedie (GB)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 12/840,896

(22) Filed: Jul. 21, 2010

(65) Prior Publication Data

US 2012/0018155 A1   Jan. 26, 2012

(51) Int. Cl.
| | |
|---|---|
| *E21B 33/13* | (2006.01) |
| *C09K 8/42* | (2006.01) |
| *C09K 8/48* | (2006.01) |
| *C04B 22/00* | (2006.01) |
| *C04B 28/04* | (2006.01) |
| *C04B 103/00* | (2006.01) |
| *C04B 111/00* | (2006.01) |

(52) U.S. Cl.
CPC .................. *C04B 22/00* (2013.01); *C04B 28/04* (2013.01); *C09K 8/48* (2013.01); *C04B 2103/0028* (2013.01); *C04B 2111/00275* (2013.01); *C04B 2111/00293* (2013.01)

(58) Field of Classification Search
CPC ............ C09K 8/48; C09K 8/42; E21B 33/13; E21B 33/261
USPC ............................ 166/285, 292, 293; 106/713
See application file for complete search history.

(56) References Cited

U.S. PATENT DOCUMENTS

| 4,666,520 | A | | 5/1987 | Bright et al. |
|---|---|---|---|---|
| 5,158,613 | A | | 10/1992 | Sargeant et al. |
| 5,211,234 | A | * | 5/1993 | Floyd ............................ 166/276 |
| 5,269,845 | A | | 12/1993 | Grunau et al. |

(Continued)

FOREIGN PATENT DOCUMENTS

RO   81395  B1   2/1983

OTHER PUBLICATIONS

Patent Cooperation Treaty, PCT International Search Report, Oct. 11, 2011.

(Continued)

*Primary Examiner* — Catherine Loikith
(74) *Attorney, Agent, or Firm* — Craig W. Roddy; Baker Botts L.L.P.

(57) ABSTRACT

A method of cementing in a subterranean formation comprising the steps of: (A) introducing a cement composition into the subterranean formation, the cement composition comprising: (i) cement; (ii) water; and (iii) a high-density additive selected from the group consisting of silicon carbide, sintered bauxite, and any combination thereof, wherein the cement composition has a density of at least 16 pounds per gallon; and (B) allowing the cement composition to set. According to an embodiment, the high-density additive is in a concentration of at least 30% by weight of the cement. A cement composition for use in an oil or gas well comprises: (A) cement; (B) water; and (C) a high-density additive selected from the group consisting of silicon carbide, sintered bauxite, and a combination thereof, wherein the high-density additive is in a concentration of at least 30% by weight of the cement, and wherein the cement composition has a density of at least 16 pounds per gallon.

23 Claims, 2 Drawing Sheets

(56) References Cited

U.S. PATENT DOCUMENTS

| | | |
|---|---|---|
| 7,678,723 B2 | 3/2010 | Duenckel et al. |
| 7,825,053 B2 | 11/2010 | Duenckel et al. |
| 8,119,576 B2 | 2/2012 | Reyes et al. |
| 2003/0121662 A1* | 7/2003 | Bosma et al. ............... 166/295 |
| 2004/0118561 A1* | 6/2004 | Heathman et al. ........... 166/292 |
| 2004/0204517 A1* | 10/2004 | Yamashita et al. ............ 524/2 |
| 2005/0284641 A1* | 12/2005 | Watkins et al. .............. 166/372 |
| 2008/0099200 A1* | 5/2008 | Wilson ....................... 166/276 |
| 2008/0314295 A1* | 12/2008 | Guevara et al. .............. 106/668 |
| 2009/0139719 A1* | 6/2009 | Luo et al. ................... 166/280.2 |

OTHER PUBLICATIONS

International Preliminary Report on Patentability for PCT/GB2011/001092 issued Jan. 22, 2013.

English translation of Romanian Patent Publication No. RO81395, published Feb. 28, 1983, 3 pages.

Machine translation of the abstract for Romanian Patent Publication No. RO81395, published Feb. 28, 1983.

* cited by examiner

CEMENT COMPOSITIONS WITH A HIGH-DENSITY ADDITIVE OF SILICON CARBIDE OR SINTERED BAUXITE

FIELD OF THE INVENTION

The invention is directed to cement compositions and methods of cementing in a subterranean formation or a well. In certain embodiments, the subterranean formation is penetrated by an oil or gas well. The invention is also directed to cement compositions and methods for use in an oil or gas well having a corrosive environment.

SUMMARY

According to an embodiment, a cement composition for use in a subterranean formation comprises: (A) cement; (B) water; and (C) a high-density additive selected from the group consisting of silicon carbide, sintered bauxite, and a combination thereof, wherein the cement composition has a density of at least 16 pounds per gallon.

According to another embodiment, a cement composition comprises: (A) cement; (B) water; and (C) a high-density additive selected from the group consisting of silicon carbide, sintered bauxite, and a combination thereof, wherein the high-density additive is in a concentration of at least 30% by weight of the cement, and wherein the cement composition has a density of at least 16 pounds per gallon.

According to another embodiment, a method of cementing in a subterranean formation or a well comprises the steps of: (A) introducing a cement composition into the subterranean formation or the well, wherein the cement composition comprises: (i) cement; (ii) water; and (iii) a high-density additive selected from the group consisting of silicon carbide, sintered bauxite, and a combination thereof, wherein the cement composition has a density of at least 16 pounds per gallon; and (B) allowing the cement composition to set.

According to another embodiment, a method of cementing in a subterranean formation or a well comprises the steps of: (A) introducing a cement composition into the subterranean formation or the well, wherein the cement composition comprises: (i) cement; (ii) water; and (iii) a high-density additive selected from the group consisting of silicon carbide, sintered bauxite, and a combination thereof, wherein the high-density additive is in a concentration of at least 30% by weight of the cement, and wherein the cement composition has a density of at least 16 pounds per gallon; and (B) allowing the cement composition to set.

As used herein, the words "comprise," "have," "include," and all grammatical variations thereof are each intended to have an open, non-limiting meaning that does not exclude additional elements or steps.

BRIEF DESCRIPTION OF THE DRAWING

The features and advantages of the inventions will be more readily appreciated when considered in conjunction with the accompanying drawing. The accompanying drawing is incorporated into the specification to help illustrate examples of certain embodiments. The drawing is not to be construed as limiting the invention.

The experiments for the data contained in the drawing were performed on two different cement compositions having a density of 19.6 pounds per gallon. The drawing includes the following figures.

DETAILED DESCRIPTION OF THE INVENTION

Figure 1:
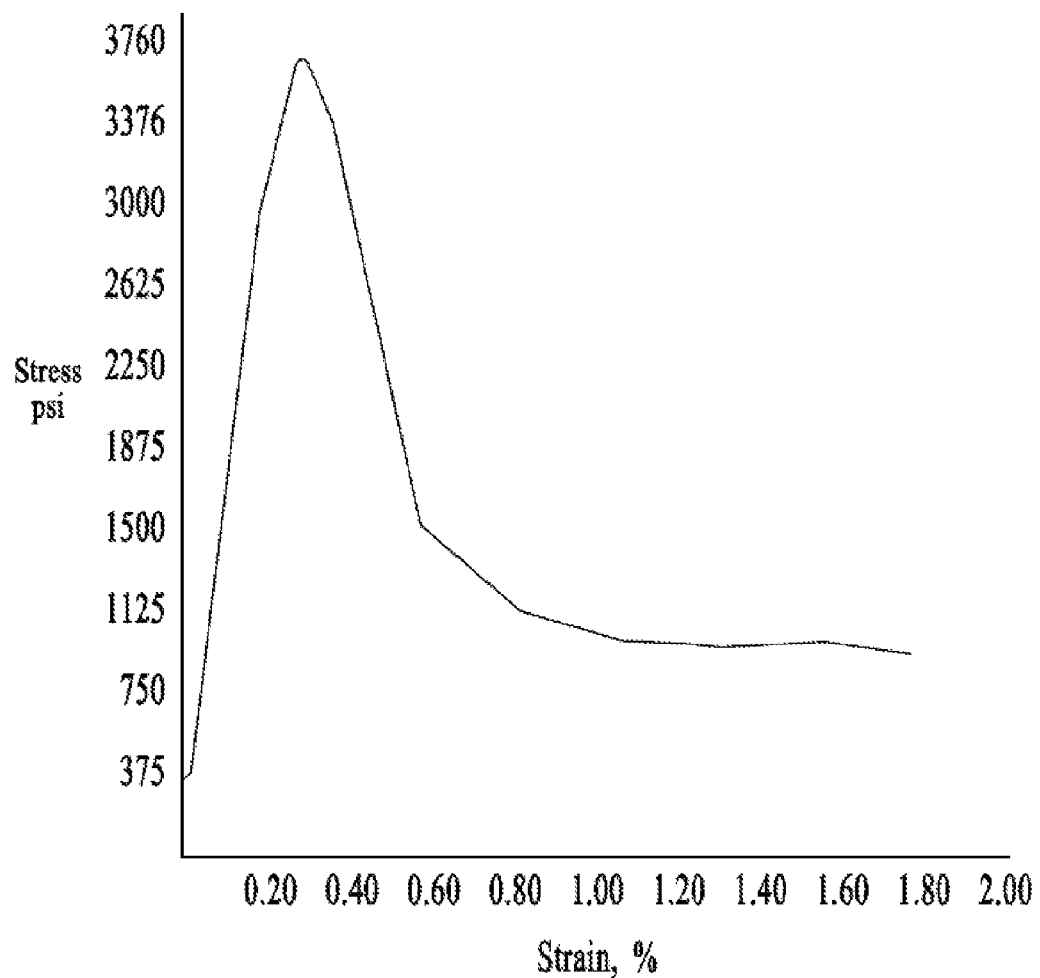
FIG. 1 is a graph of stress in pound-force per square inch (psi) versus strain (%) for a cement composition containing the following major ingredients: 204 grams (g) Premium Class G cement; 210 g of microfly ash (a filler material), SSA-1™ and SSA-2™ (strength retrogression additives); 108 g barite (Sweepwate™); 300 g of a high-density additive (silicon carbide); and 148 g water containing 4.6% sodium chloride by weight of the water, wherein the cement composition was maintained under a temperature condition of 212° F. and a pressure of 3000 psi for 24 hrs.

Oil and gas hydrocarbons are naturally occurring in some subterranean formations. A subterranean formation containing oil or gas is sometimes referred to as a reservoir. A reservoir may be located under land or off shore. Reservoirs are generally located in the range of a few hundred feet (shallow reservoirs) to a few tens of thousands of feet (ultra-deep reservoirs). In order to produce oil or gas, a well is drilled into a subterranean formation.

As used herein, a "well" includes at least one wellbore drilled into a subterranean formation, which may be a reservoir or adjacent to a reservoir. A wellbore can have vertical and horizontal portions, and it can be straight, curved, or branched. As used herein, the term "wellbore" refers to a wellbore itself, including any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

As used herein, a "fluid" is a substance having a continuous phase and that tends to flow and to conform to the outline of its container when the substance is tested at a temperature of 71° F. and a pressure of one atmosphere. An example of a fluid is a liquid or gas. As used herein, a "fluid" can have more than one distinct phase. For example, a "fluid" can be or include a slurry, which is a suspension of solid particles in a continuous liquid phase; it can be or include an emulsion, which is a suspension of two or more immiscible liquids where droplets of at least one liquid phase are dispersed in a continuous liquid phase of another; or it can be or include a foam, which is a suspension or dispersion of gas bubbles in a continuous liquid phase.

In order to produce oil or gas, a wellbore is drilled into or near a subterranean formation. The wellbore may be an open hole or cased hole. In an open-hole wellbore, a tubing string is placed into the wellbore. The tubing string allows fluids to be introduced into or flowed from a remote portion of the wellbore. In a cased hole, a casing is placed into the wellbore that can contain a tubing string. In an open hole, the space between the wellbore and the outside of a tubing string is an annulus. In a cased hole, the space between the wellbore and the outside of the casing is an annulus. Also, in a cased hole, there may be an annulus between the tubing string and the inside of the casing.

As used herein, a "cement composition" is a mixture of at least cement and water. The cement composition can also include additives. As used herein, the term "cement" means a dry powder substance that acts as a binder to bind other materials together. During well completion, it is common to introduce a cement composition into an annulus in the wellbore. For example, in a cased hole, the cement composition is placed into and allowed to set in the annulus between the wellbore and the casing in order to stabilize and secure the casing in the wellbore. The set cement composition has a low permeability, and as such, fluids are substantially inhibited from flowing into the annulus. Consequently, oil or gas can be produced in a controlled manner by directing the flow of oil or gas through the casing and into the wellhead. Cement compositions can also be used in well-plugging operations or gravel-packing operations.

During cementing operations, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

As used herein, if any test (e.g., thickening time, compressive strength, or permeability) requires the step of "mixing the cement composition," then the mixing step is performed according to ANSI/API Recommended Practice 10B-2 as follows. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. and about 1 atmosphere of pressure). It is also to be understood that if any test (e.g., thickening time or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. and then placed into the testing apparatus and the temperature of the cement composition can be ramped up to the specified temperature. As used herein, the rate of ramping up the temperature is in the range of about 3° F./min to about 5° F./min. After the cement composition is ramped up to the specified temperature and possibly pressure, the cement composition is maintained at that temperature and pressure for the duration of the testing.

As used herein, if any test (e.g., compressive strength or permeability) requires the step of "curing the cement composition," then the curing step is performed according to ANSI/API Recommended Practice 10B-2 as follows. After the cement composition has been mixed, the cement composition is poured into a curing mould. The curing mould is placed into a pressurized curing chamber and the curing chamber is maintained at a temperature of 212° F. and 3000 psi. The cement composition is allowed to cure for the length of time necessary for the composition to set. After the composition has set, the curing mould is placed into a water cooling bath until the cement composition sample is tested.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured according to ANSI/API Recommended Practice 10B-2 as follows. The cement composition is mixed. The cement composition is then placed in the test cell of a High-Temperature, High-Pressure (HTHP) consistometer, such as a Fann Model 275 or a Chandler Model 8240. The cement composition is tested in the HTHP consistometer at the specified temperature and pressure. Consistency measurements are taken continuously until the consistency of the cement composition exceeds 70 Bc.

A cement composition can develop compressive strength. Cement composition compressive strengths can vary from 0 psi to over 10,000 psi. Compressive strength is generally measured at a specified time after the cement composition has been mixed and at a specified temperature and pressure. For example, compressive strength can be measured at a time in the range of about 24 to about 48 hours at a temperature of 212° F. According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed. Then, the mixed composition is cured. The cured cement composition sample is placed in a compressive strength testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time to compressive strength. The UCA reports the compressive strength of the cement composition in units of pressure, such as psi or megapascals (MPa).

The compressive strength of a cement composition can be used to indicate whether the cement composition has set. A cement composition "initially sets." As used herein, a cement composition is considered "initially set" when the cement composition has developed a compressive strength of 50 psi using the non-destructive compressive strength method. As used herein, the "initial setting time" is the difference in time between when the cement is added to the water and when the cement composition is initially set. If not otherwise stated, the setting and the initial setting time is determined at a temperature of 212° F. and a pressure of 3,000 psi.

As used herein, the term "set" is intended to mean the process of becoming hard or solid by curing. It can take up to 72 hours or longer for some cement compositions to initially set. A cement composition sample that is at least initially set is suitable for destructive compressive strength testing and permeability testing. Some cement compositions can continue to develop a compressive strength greater than 50 psi over the course of several days. The compressive strength of some cement compositions can reach over 10,000 psi.

After the cement composition has set in the portion of the well to be cemented, the composition can have a low permeability. Permeability refers to how easily fluids can flow through a material. For example, if the permeability is high, then fluids will flow more easily and more quickly through the material. If the permeability is low, then fluids will flow less easily and more slowly through the material. As used herein, "high permeability" means the material has a permeability of at least 100 millidarcy (mD). As used herein, "low permeability" means the material has a permeability of less than 1 mD.

As used herein, the "initial permeability" of a cement composition is measured according to ANSI/API Recommended Practice 10B-2. The cement composition is mixed. The cement composition sample is then cured to be initially set. The initial permeability is measured by gas permeability. A core taken from the cured sample is then placed in a Hassler sleeve of in the pulse decay permeameter [Gas Permeameter Ultraperm-700, Temco Division of Core Lab., Tulsa, Okla., USA]. Nitrogen gas is then flowed through the core at a specified temperature condition by applying a specified pressure differential across the core. There is no flow rate measuring device in the system. The gas flows from an upstream test gas reservoir to the downstream gas reservoir through the high pressure core holder (Hassler Style loading). The upstream and the downstream reservoirs have known volumes. When fluid flows from the upstream reservoir the pressure decreases and when the fluid enters the downstream reservoir the pressure increases in the downstream reservoir. Flow rate can thus be calculated from the known volume of each reservoir, fluid compressibility, and rate of change of pressure. The PDP-200 operating software will then calculate the permeability.

As used herein, the "final permeability" of a cement composition in acid environment is measured as follows. After the initial permeability for the cement composition sample has been determined, the same cured sample is immersed in dilute hydrochloric acid having pH about 2. The sample is kept in the diluted HCl solution for 24 hours. The pH of diluted acid solution is kept much lower than the pH of a solution of either $H_2S$ or carbonic acid (which have pH around 4). The sample is then removed from the acid solution and is thoroughly washed with water and dried in oven for 24 hr at 80° F. before subjecting the sample to the same gas permeability measurement described for the initial permeability testing.

Cement compositions can contain additives. An example of an additive is a high-density additive. As used herein, a "high-density" additive is an additive that has a density greater than 3 $g/cm^3$.

Some metal oxides can be used as a high-density additive. As used herein, a "metal oxide" is a metal cation or transition metal cation with an oxide anion. Examples of metal oxides include, but are not limited to, iron oxide ($Fe_2O_3$) and manganese oxide ($Mn_3O_4$). A commercially available example of an iron oxide high-density additive is Hi-Dense™ and an example of a commercially available manganese oxide is Micromax™, both available from Halliburton Energy Services, Inc. in Duncan, Okla.

Some oil and gas wells can have a corrosive environment. As used herein, a "corrosive environment" is an environment containing corrosive materials. Examples of corrosive materials include, but are not limited to, liquids with a pH below 5, acid gas, or fluids containing dissolved acid gas. As used herein, the term "acid gas" means any gas that can mix with water to form an acidic solution having a pH below 5. The most common acid gases are hydrogen sulfide ($H_2S$) and carbon dioxide ($CO_2$). For example, $CO_2$ reacts with water to form carbonic acid in an aqueous solution.

A cement composition that contains a metal oxide, high-density additive is prone to corrosion if introduced into a well having a corrosive environment. For example, after the cement composition has set in the portion of the well, the corrosive materials in the well can corrode a portion of the cement composition. Consequently, for example, oil or gas can flow more easily through the annulus and it can be more difficult to produce oil or gas in a controlled manner through the casing. Moreover, as the permeability of the set composition increases, the corrosive materials can flow through the set composition and come in contact with the casing. The corrosive materials can then corrode portions of the casing. Moreover, if the set cement composition comes into contact with corrosive materials, some of the metal oxide of the cement composition can dissolve out of the composition and then precipitate elsewhere to plug up other areas of the well. As a result, it can become more difficult to produce oil or gas.

It has been discovered that a high-density additive selected from silicon carbide, sintered bauxite, and a combination thereof can be used in a cement composition for introduction into an oil or gas well. The invention is particularly adapted for use in an oil or gas well that has a corrosive environment. The cement composition is not as susceptible to corrosion by the corrosive materials in the well compared to a cement composition that contains a metal oxide, such as $Fe_2O_3$ or $Mn_3O_4$. Accordingly, it is preferable that the cement composition according to the invention include less than 4% bwc of a metal oxide.

According to an embodiment, a cement composition for use in an oil or gas well comprises: (A) cement; (B) water; and (C) a high-density additive selected from the group consisting of silicon carbide, sintered bauxite, and a combination thereof, wherein the cement composition has a density of at least 16 pounds per gallon.

According to another embodiment, a cement composition for use in an oil or gas well comprises: (A) cement; (B) water; and (C) a high-density additive selected from the group consisting of silicon carbide, sintered bauxite, and a combination thereof, wherein the high-density additive is in a concentration of at least 30% by weight of the cement, and wherein the cement composition has a density of at least 16 pounds per gallon.

According to another embodiment, a method of cementing in a subterranean formation or a well comprises the steps of: (A) introducing a cement composition into the subterranean formation or the well, the cement composition comprising: (i) cement; (ii) water; and (iii) a high-density additive selected from the group consisting of silicon carbide, sintered bauxite, and a combination thereof, wherein the cement composition has a density of at least 16 pounds per gallon; and (B) allowing the cement composition to set.

According to another embodiment, a method of cementing in a subterranean formation or a well comprises the steps of: (A) introducing a cement composition into the subterranean formation or the well, the cement composition comprising: (i) cement; (ii) water; and (iii) a high-density additive selected from the group consisting of silicon carbide, sintered bauxite, and a combination thereof, wherein the high-density additive is in a concentration of at least 30% by weight of the cement, and wherein the cement composition has a density of at least 16 pounds per gallon; and (B) allowing the cement composition to set.

The discussion of preferred embodiments regarding the cement composition, or any ingredient in the cement composition, is intended to apply to the methods of the invention and the cement compositions of the invention. Any reference to the unit "gallons" means U.S. gallons.

The cement composition includes cement. Preferably, the cement is Portland Cement Type I, II, or III. Preferably, the cement is Class A cement, Class C cement, Class G cement, or Class H cement. The cement can be in a concentration of more than 70% by weight of the water. Preferably, the cement is in a concentration in the range of 70% to 150% by weight of the water. More preferably, the cement is in a concentration of more than 130% by weight of the water.

The cement composition includes water. The cement composition can also include a water-soluble salt. Preferably, the salt is selected from sodium chloride, calcium chloride, calcium bromide, potassium chloride, potassium bromide, magnesium chloride, and a combination thereof in any proportion. Preferably, the cement composition contains less than 10% by weight of the water (bww) of water-soluble salts. As used herein, "water-soluble salt" means greater than 1 part of the salt dissolves in 5 parts of deionized water at a temperature of 80° F. Preferably, the salt is in a concentration in the range of about 0.1% to about 10% by weight of the water. Thus, the water can be selected, for example, from the group consisting of freshwater, brackish water, saltwater, brine, and any combination thereof.

The cement composition includes a high-density additive selected from the group consisting of silicon carbide, sintered bauxite, and a combination thereof. The silicon carbide and sintered bauxite have a density of greater than 3 g/cm$^3$.

Silicon carbide (SiC), also known as carborundum, is a compound composed of silicon and carbon. Examples of suitable commercially-available silicon carbide include Carborex® available from Washington Mills in USA.

Sintered bauxite is in the chemical family of aluminosilicates and is a high-strength bauxite. Sintering is a process of heating a particulate, such as a powder, below its melting point so the particles stick together to form a substantially coherent mass. Sintered bauxite composition includes alumina in more than 80%. In addition, it also contains some $SiO_2$, $TiO_2$ and $Fe_2O_3$]. An example of a suitable commercially-available sintered bauxite include CarboHSP® from CARBO Ceramics in USA.

The silicon carbide and sintered bauxite are water insoluble. As used herein, the term "water insoluble" means that less than 1 part of the high-density additive dissolves in 99 parts of water at a temperature of 80° F. Silicon carbide and sintered bauxite are chemically inert.

Preferably, a high-density additive has a Mohs hardness greater than 3. Silicon carbide and sintered bauxite have a Mohs hardness greater than 3. Mohs scale of hardness refers to the scratch resistance of a material and is determined by finding the hardest material that the material can scratch and/or the softest material that can scratch the material. For example, silicon carbide has a Mohs hardness of 9.5 and sintered bauxite has a Mohs hardness of 9.

The high-density additive is in the form of a particulate. Preferably, the particulate of the high-density additive is substantially spherical in shape. Preferably, the high-density additive has a particle size distribution such that at least 90% of the additive has a particle size greater than 40 micrometers (μm). More preferably, the high-density additive has a particle size distribution such that at least 90% of the additive has a particle size in the range of about 40 to about 850 μm.

According to certain embodiments, the high-density additive is in a concentration of at least 30% by weight of the cement. It is preferred that the high-density additive is in a concentration in the range of about 40% to about 150% by weight of the cement. Most preferably, the high-density additive is in a concentration in the range of about 70% to about 130% by weight of the cement.

The cement composition has a density of at least 16 pounds per gallon (ppg). Preferably, the composition has a density of at least 20 ppg. The cement composition can have a density in the range of 16 to about 25 ppg. More preferably, the cement composition has a density of at least 18 pounds per gallon.

The cement composition preferably has an initial permeability in the range of 0.01 to 1 mD at a temperature condition of 71° F. and a pressure differential of 50 psi. Preferably, the cement composition has a final permeability in the range of 0.01 to 1 mD at a temperature condition of 71° F. and a pressure differential of 50 psi.

According to the embodiments for the method of cementing, preferably the subterranean formation or the well is a corrosive environment.

Preferably the cement composition develops an initial permeability in the range of 0.01 to 1 mD after introduction into the well and after the composition has set in the well. For this determination, a sample of the cement is cured in an autoclave at bottomhole temperature and 3,000 psi pressure for 24 hours. The sample is then removed from the autoclave and the initial permeability is determined at 71° F. and a pressure differential of 50 psi. The bottomhole temperature refers to the downhole temperature at the portion of the well to be cemented. Preferably, the cement composition develops a final permeability in the range of 0.01 to 1 mD.

The cement composition preferably has a final permeability less than about ten (10) times the initial permeability, when tested at a temperature condition of 71° F. and a pressure differential of 50 psi. It is more preferable that the high-density additive is in a sufficient concentration such that the composition has a final permeability less than about five (5) times the initial permeability, when tested at a temperature condition of 71° F. and a pressure differential of 50 psi. Considering the very low initial permeability of less than 1 mD, these increases are considered to be low.

Preferably, the cement composition has a thickening time of at least 3 hours at a temperature of 176° F. and a pressure of 10,000 psi. More preferably, the cement composition has a thickening time in the range of about 4 to about 10 hours at a temperature of 176° F. and a pressure of 10,000 psi.

Preferably, the cement composition sets in less than 48 hours at a temperature of 212° F. and a pressure of 3,000 psi. More preferably, the cement composition has an initial setting time of less than 24 hours at a temperature of 212° F. and a pressure of 3,000 psi. Most preferably, the cement composition sets at a time in the range of about 6 to about 24 hours at a temperature of 212° F. and a pressure of 3,000 psi.

Preferably, the cement composition has a compressive strength of at least 500 psi when tested at 24 hours and a temperature of 212° F. and a pressure of 3,000 psi. More preferably, the cement composition has a compressive strength in the range of about 500 to about 10,000 psi when tested at 24 hours and a temperature of 212° F. and a pressure of 3,000 psi.

According to the method embodiments, preferably, the cement composition has a thickening time of at least 3 hours at the bottomhole temperature and pressure of the well. More preferably, the cement composition has a thickening time in the range of about 4 to about 10 hours at the bottomhole temperature and pressure of the well. For example, one of skill in the art will be able to select the thickening time based on the specific conditions of the well (e.g., the length of the casing and the bottomhole temperature of the well). Some of the variables that can affect the thickening time of the cement composition include the concentration of any set retarder present in the composition, the concentration of any salt present in the composition, and the bottomhole temperature and pressure of the well.

Preferably, the cement composition has an initial setting time of less than 48 hours at the bottomhole temperature and pressure of the well. Preferably, the cement composition sets in less than 48 hours at the bottomhole temperature and pressure of the well. More preferably, the cement composition sets at a time in the range of about 12 to about 24 hours at the bottomhole temperature and pressure of the well. Some of the variables that can affect the initial setting time of the cement composition include the concentration of any set retarder present in the composition, the concentration of any salt present in the composition, and the bottomhole temperature and pressure of the well.

It is preferred that the cement composition develop a compressive strength of at least 1,500 psi after the cement composition has been introduced into the well and is situated in the portion of well to be cemented.

Preferably, the cement composition is used in a well having a bottomhole temperature of at least 150° F. Preferably, the bottomhole temperature is in the range of about 150° F. to about 500° F. More preferably, the bottomhole temperature is in the range of about 180° F. to about 400° F. Most preferably, the bottomhole temperature is in the range of about 180° F. to about 350° F.

The cement composition can further include an additional high-density additive. For example, the additional high-density additive can be barite (barium sulfate). An example of barite is Sweepwate™, commercially available from Halliburton Energy Services, Inc. in Duncan, Okla. If an additional high-density additive is used, then preferably the additional high-density additive is in a concentration in the range of about 30% to about 150% bwc. However, if the additional high-density additive is a metal oxide, then preferably the metal oxide is in a concentration of less than 4% bwc.

The cement composition can include at least one additive suitable for use in subterranean cementing operations. Examples of such additives include, but are not limited to, a stabilizing additive, a filler, a friction reducer, a strength-retrogression additive, a set accelerator, a set retarder, a lightweight additive, a gas-generating additive, a mechanical property enhancing additive, a lost-circulation material, a filtration-control additive, a dispersant, a fluid loss additive, a defoaming agent, a foaming agent, an expansion additive, a thixotropic additive, and a nano-particle.

The cement composition can include a strength retrogression additive. The strength retrogression additive helps suspend the high-density additive. The material can be selected from coarse silica flour, fine silica flour, and a combination thereof. The strength retrogression additive can be selected from the group consisting of SSA-1™, SSA-2™ (available from Halliburton Energy Services, Inc. in Duncan, Okla.), and a combination thereof. Preferably, the strength retrogression additive is in a concentration in the range of about 20% to about 50% bwc.

The cement composition can include a friction reducer. Suitable examples of friction reducers include CFR®2, CFR®3, CFR®5LE, CFR®6, CFR®8, available from Halliburton Energy Services, Inc. in Duncan, Okla. Preferably, the friction reducer is in a concentration in the range of about 0.05% to about 3% bwc.

The cement compositions can include a fluid loss additive. Suitable examples of fluid loss additives include HALAD®344, HALAD®413, HALAD®400, HALAD®9, HALAD®14, HALAD®23, HALAD®100A, HALAD®300, HALAD®350, HALAD®400L, HALAD®600, HALAD®600LE+, HALAD®613, HALAD®766, Latex 2000, LAP-1, and LA-2, available from Halliburton Energy Services, Inc. in Duncan, Okla. Preferably, the fluid loss additive is in a concentration in the range of about 0.1% to about 4% bwc.

The cement composition can include a filler material. Suitable examples of filler materials include, but are not limited to, micro fly ash or Fly ash. Preferably, the filler material is in a concentration in the range of about 5% to about 50% bwc.

The cement compositions can include a set retarder. Suitable examples of a set retarder include SCR-100™, SCR-500, HR-800, and HR-5, HR-6L, HR-25, available from Halliburton Energy Services, Inc. in Duncan, Okla. Preferably, the set retarder is in a concentration in the range of 0.05% to 3% bwc.

The cement compositions can include other additives, for example, a defoamer and an expansion additive. An example of a defoamer is D-AIR 3000L™ and an example of an expansion additive is Microbond HT™, available from Halliburton Energy Services, Inc. in Duncan, Okla.

The cement composition can also include other additives. Commercially-available examples of other additives include, but are not limited to, Micromatrix Cement™, Micromax™, Silicalite™, HGS-6000™, HGS-4000™, HGS-10000™, Well life 665™, Well life 734™, Well life 809™, and Well life 810™, available from Halliburton Energy Services, Inc. in Duncan, Okla.

The method embodiments include the step of introducing the cement composition into a subterranean formation or a well. The step of introducing can be for the purpose of well completion, primary or remedial cementing operations, squeeze cementing, well-plugging, or gravel packing. Preferably, the portion of the well to be cemented is a portion of the annulus. Preferably, the portion of the well is a corrosive environment. The cement composition is in a pumpable state during introduction into the subterranean formation or the well and at least until the composition is situated in the portion of the subterranean formation or the well to be cemented.

The method embodiments also include the step of allowing the cement composition to set after introduction into the subterranean formation or the well. Preferably, after the step of allowing the cement composition to set, the permeability of the set composition does not increase to more than 1 mD under the downhole conditions, which can include a corrosive environment and high temperature and pressure.

The method can include the additional steps of perforating, fracturing, performing an acidizing treatment, or performing well completion, after the step of allowing the cement composition to set.

EXAMPLES

To facilitate a better understanding of the present invention, the following examples of certain embodiments are given. The following examples are not the only examples that could be given according to the present invention and are not intended to limit the scope of the invention.

Two different cement compositions according to the invention, having a density of 19.6 pounds per gallon (ppg), were prepared. Table 1 lists the ingredients for the first cement composition and Table 2 lists the rheology readings for the first composition. Table 3 lists the ingredients for the second cement composition and Table 4 lists the rheology readings for the second composition. The rheology of both the cement compositions were measured using a FANN 35 viscometer with a standard Bob and Sleeve attachment and Spring number 1 at a temperature of 70° F. and a dial reading of 3 to 600 revolutions per minute (rpm).

TABLE 1

| Ingredient | Quantity in grams (g) |
| --- | --- |
| Premium Class G cement | 204.0 |
| Filler (micro fly ash) | 120.0 |
| Friction Reducer (CFR-3) | 6.0 |
| Fluid Loss Additive (HALAD-413) | 1.5 |
| Set Retarder (SCR-100) | 1.8 |
| Stabilizing Additive (SSA-1) | 45.0 |
| Stabilizing Additive (SSA-2) | 45.0 |
| Barite (Sweepwate) | 108.0 |
| Silicon Carbide (particle size 45 to 425 micrometers) | 300.0 |
| Sodium Chloride | 6.8 |
| Defoamer (D-AIR 3000L) | 0.2 |
| Water | 148.0 |

TABLE 2

| RPM | Rheology Reading |
| --- | --- |
| 3 | 7 |
| 6 | 11 |
| 30 | 42 |
| 60 | 78 |
| 100 | 122 |
| 200 | 194 |
| 300 | 262 |

Best rheology model suggests that the fluid (shortly after initial mixing) of the first cement composition obeys power law model for rheology. The shear-thinning index of this slurry is about 0.751. A shear-thinning index of less than 1 is good for better displacement in eccentric annuli.

TABLE 3

| Ingredient | Quantity in grams (g) |
| --- | --- |
| Premium Class G cement | 183.3 |
| Micromatrix Cement | 50.0 |
| Friction Reducer (CFR-3) | 6.0 |
| Fluid Loss Additive (HALAD-413) | 2.0 |
| Set Retarder (SCR-100) | 2.0 |
| Expansion Additive (Microbond HT) | 12.5 |
| Barite (Sweepwate) | 275.0 |
| Sintered Bauxite (Semi-crystalline Aluminosilicate particle size 45 to 425 micrometers) | 125.0 |
| Sodium Chloride | 5.0 |
| Defoamer (D-AIR 3000L) | 2.2 |
| Water | 167.2 |

TABLE 4

| RPM | Rheology Reading |
| --- | --- |
| 3 | 6 |
| 6 | 9 |
| 30 | 12 |
| 60 | 36 |
| 100 | 55 |
| 200 | 94 |
| 300 | 142 |

This fluid of the second cement composition (shortly after mixing) obeys GHB-4 model with YP value of 4 lbf/100 ft$^2$. The behaviour of the fluid is close to Bingham Plastic fluid where shear thinning index is 0.9.

TABLE 5

| Sample Name | Initial Permeability (mD) | Permeability after etching sample in diluted acid solution (mD) |
| --- | --- | --- |
| 19.6 ppg cement sample containing SiC | 0.03 | 0.14 |

As can be seen in Table 5, the initial permeability is very low. The final permeability is less than 5 times the initial permeability. In addition, the final permeability is still less than 1 mD.

Figure 2:
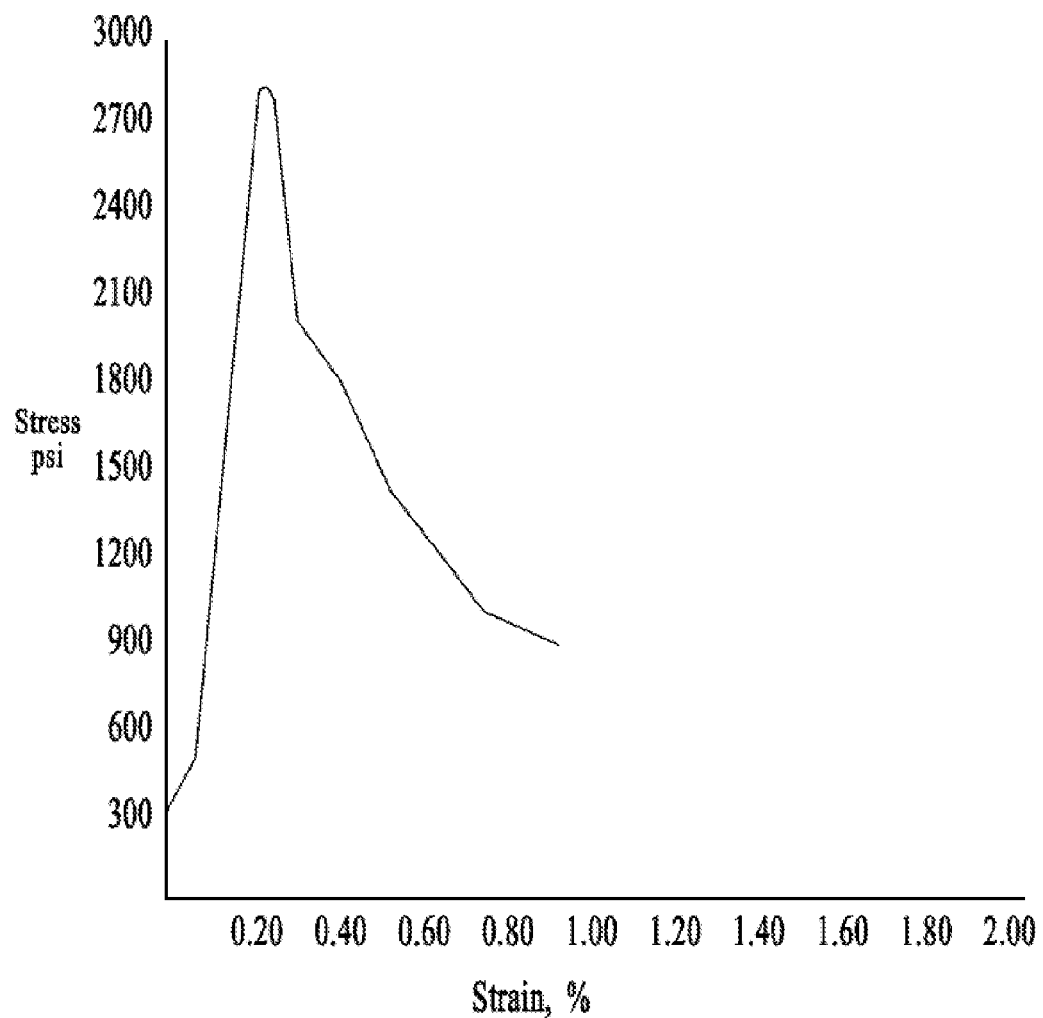
FIG. 2 is a graph of stress (psi) versus strain (%) for a cement composition containing the following major ingredients: 183.3 g Premium Class G cement; 50 g Micromatrix™ cement; 275 g barite (Sweepwate™); 125 g of a high-density additive (sintered bauxite); and 167.2 g water containing 3% sodium chloride by weight of the water, wherein the cement composition was maintained under a temperature condition of 212° F. and a pressure of 3000 psi.

FIG. 1 is a graph of stress in pound-force per square inch (psi) versus strain (%) for the first cement composition at a temperature of 212° F. FIG. 2 is a graph of stress in pound-force per square inch (psi) versus strain (%) for the second cement composition at a temperature of 212° F. The graphs show the results for a destructive compressive strength test. The cement composition was mixed and then cured. The sample was then tested to determine the compressive strength of the cement composition using a Super L Universal testing machine model 602, available from Tinius Olsen, Horsham in Pennsylvania, USA. As can be seen in FIG. 1, the first cement composition developed a compressive strength of 3620 psi. As can be seen in FIG. 2, the second cement composition developed a compressive strength of 2870 psi.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation, the method comprising the steps of:
   (A) introducing a cement composition into the subterranean formation, the cement composition comprising:
       (i) cement;
       (ii) water; and
       (iii) a high-density additive selected from the group consisting of silicon carbide, sintered bauxite, and a combination thereof, wherein the high-density additive is in a concentration in the range of about 30% to about 150% by weight of the cement,
       wherein the cement composition is a pumpable fluid, and
       wherein the cement composition has a density of at least 16 pounds per gallon;
   (B) allowing the cement composition to set.

2. The method according to claim 1, wherein the cement is Class A cement, Class C cement, Class G cement, or Class H cement.

3. The method according to claim 1, wherein the cement is in a concentration of more than 70% by weight of the water.

4. The method according to claim 1, wherein the cement is in a concentration of more than 130% by weight of the water.

5. The method according to claim 1, wherein the water is selected from the group consisting of freshwater, brackish water, saltwater, brine, and any combination thereof.

6. The method according to claim 1, wherein the high-density additive has a particle size distribution such that at least 90% of the additive has a particle size in the range of about 40 to about 850 micrometers.

7. The method according to claim 1, wherein the high-density additive is in a concentration in the range of about 70% to about 130% by weight of the cement.

8. The method according to claim 1, wherein the cement composition has a density of at least 18 pounds per gallon.

9. The method according to claim 1, wherein the cement composition an initial permeability less than 1 mD at a temperature condition of 71° F. and a pressure differential of 50 psi.

10. The method according to claim 9, wherein the cement composition has a final permeability less than 10 times the initial permeability at a temperature condition of 71° F. and a pressure differential of 50 psi.

11. The method according to claim 9, wherein the cement composition has a final permeability less than 5 times the initial permeability at a temperature condition of 71° F. and a pressure differential of 50 psi.

12. The method according to claim 1, wherein the cement composition has a thickening time of at least 3 hours maintained under a temperature condition of 176° F. and a pressure of 10,000 psi.

13. The method according to claim 1, wherein the cement composition has a thickening time in the range of 4 to 10 hours maintained under a temperature condition of 176° F. and a pressure of 10,000 psi.

14. The method according to claim 1, wherein the cement composition sets in less than 48 hours maintained under a temperature condition of 212° F. and a pressure of 3,000 psi.

15. The method according to claim 1, wherein the cement composition has a compressive strength of at least 500 psi when tested at 24 hours.

16. The method according to claim 1, further comprising an additional high-density additive.

17. The method according to claim 16, wherein the additional high-density additive is barite.

18. A method of cementing in a subterranean formation, the method comprising the steps of:
    (A) introducing a cement composition into the subterranean formation, the cement composition comprising:
        (i) cement;
        (ii) water; and
        (iii) a high-density additive comprising silicon carbide, wherein the high-density additive is in a concentration in the range of about 30% to about 150% by weight of the cement,
        wherein the cement composition is a pumpable fluid, and
        wherein the cement composition has a density of at least 16 pounds per gallon; and
    (B) allowing the cement composition to set.

19. The method according to claim 18, wherein the cement composition comprises less than 4% ewe by weight of cement of a metal oxide.

20. The method according to claim 18, wherein the cement composition comprises a filler material selected from the group consisting of micro fly ash or fly ash.

21. A method of cementing in a subterranean formation, the method comprising the steps of:
    (A) introducing a cement composition into the subterranean formation, the cement composition comprising:
        (i) cement;
        (ii) water; and
        (iii) a high-density additive comprising sintered bauxite, wherein the high-density additive is in a concentration in the range of about 30% to about 150% by weight of the cement,
        wherein the cement composition is a pumpable fluid, and
        wherein the cement composition has a density of at least 16 pounds per gallon; and
    (B) allowing the cement composition to set.

22. The method according to claim 21, wherein the cement composition comprises less than 4% ewe by weight of cement of a metal oxide.

23. The method according to claim 21, wherein the cement composition comprises a filler material selected from the group consisting of micro fly ash or fly ash.

* * * * *